(12) United States Patent
Zhang

(10) Patent No.: US 6,764,664 B2
(45) Date of Patent: Jul. 20, 2004

(54) CATALYST FOR THE COMBUSTION OF DIESEL SOOT, METHODS FOR MAKING THE CATALYST AND METHODS OF USING THE CATALYST

(75) Inventor: Wenzhong Zhang, Broken Arrow, OK (US)

(73) Assignee: Delphi Technologies, Inc., Troy, MI (US)

( * ) Notice: Subject to any disclaimer, the term of this patent is extended or adjusted under 35 U.S.C. 154(b) by 276 days.

(21) Appl. No.: 10/127,252

(22) Filed: Apr. 22, 2002

(65) Prior Publication Data

US 2003/0198583 A1 Oct. 23, 2003

(51) Int. Cl.$^7$ .......................... B01J 23/04; B01J 23/42
(52) U.S. Cl. ................... 423/215.5; 423/213.2; 423/213.5; 502/325; 502/328; 502/330; 502/339; 502/344; 502/355
(58) Field of Search ................. 502/325, 328, 502/330, 339, 344, 355; 423/215.5, 213.2, 213.5

(56) References Cited

U.S. PATENT DOCUMENTS

| | | | | |
|---|---|---|---|---|
| 4,515,758 A | | 5/1985 | Domesle et al. | 423/213 |
| 5,146,013 A | * | 9/1992 | Dogimont et al. | 570/101 |
| 5,536,695 A | * | 7/1996 | Blejean et al. | 502/327 |
| 5,614,596 A | | 3/1997 | Laine et al. | 525/389 |
| 5,853,675 A | | 12/1998 | Howorth | 422/179 |
| 5,885,917 A | * | 3/1999 | Ohdan et al. | 501/153 |
| 5,939,354 A | | 8/1999 | Golden | 502/525 |
| 5,977,017 A | | 11/1999 | Golden | 502/525 |
| 6,013,599 A | | 1/2000 | Manson | 502/340 |
| 6,248,689 B1 | | 6/2001 | Manson | 502/340 |
| 6,352,955 B1 | | 3/2002 | Golden | 502/302 |
| 6,372,686 B1 | | 4/2002 | Golden | 502/302 |
| 6,498,280 B1 | * | 12/2002 | Uzio et al. | 585/654 |

FOREIGN PATENT DOCUMENTS

JP            8-173770        *   7/1996

OTHER PUBLICATIONS

Joint Committee of Powder Diffraction Standars (JCPDS), International Center for Diffraction, card No. 29–0820, no date available.
Waldner, et al. "Synthesis of a Double Alkoxide Precursor to Spinel (MgAL2O4) Directly from Al (OH)3, MgO, and Triethanolamine and Its Pyrolytic Transformation to Spinel" Chem. Material., vol. 8, No. 12, pp. 2850–2857 (1996).
H.R. Hoekstra, et al., "Synthesis of Pyrochlore–Type Oxides of Platinum (IV) at High Pressure", Inorganic Chemistry, vol. 7, No. 12, Dec. 1968, Received Jul. 11, 1968, pp. 2553–2557.
Y. Nishihata, et al., "Self–regeneration of a Pd–perovskite catalyst for automotive emissions control", Letters to Nature, vol. 418, Jul. 11, 2002, pp. 164–167.
Magdalena Helmer, "Cleaning up Catalysts", Nature, vol. 418, Jul. 11, 2002, p. 138.

* cited by examiner

*Primary Examiner*—Kiley Stoner
*Assistant Examiner*—Christina Ildebrando
(74) *Attorney, Agent, or Firm*—Paul L. Marshall

(57) ABSTRACT

A catalyst composition is disclosed for the reduction of soot and undesirable gaseous emissions from engine exhaust, particularly exhaust from diesel engines. The catalyst contains an alkali metal catalytic metal oxide, preferably lithium platinum oxide, in which the catalytic metal is atomically isolated. For improved performance in a diesel particulate filter, the alkali catalytic metal oxide is uniformly dispersed on an alkali metal aluminate such as lithium aluminate. Also disclosed is the catalytic device comprising this catalyst.

12 Claims, 4 Drawing Sheets

US 6,764,664 B2

CATALYST FOR THE COMBUSTION OF DIESEL SOOT, METHODS FOR MAKING THE CATALYST AND METHODS OF USING THE CATALYST

TECHNICAL FIELD

This disclosure relates to the purification of contaminants and particulates from exhaust gases. More particularly, this disclosure relates to a catalyst composition for exhaust gas purification, including soot combustion.

BACKGROUND OF THE DISCLOSURE

In order to meet exhaust gas emission standards, the exhaust emitted from internal combustion engines is treated prior to emission into the atmosphere. Exhaust is passed through a catalytic element to remove undesirable gaseous emission components such as unburned hydrocarbons, carbon monoxide and nitrogen oxides. In addition to the gaseous components, exhaust gases also contain particulate matter such as carbon-containing particles or soot. A particulate filter, also commonly used with compression ignition engines, is used to prevent soot, or carbon particles, from exiting the tailpipe. Carbon particles are stored in the filter and then burned so that the filter is regenerated and able to again store the carbon particles. In a passive diesel particulate filter, the filter becomes so filled with particulate matter that the heat accumulated due to increased vehicle speed or load raises the temperature of the carbon to a temperature at which it ignites.

In the process to develop a catalyzed diesel particulate filter, it has been shown that eutectic salts such as $KVO_3$ (potassium vanadate) and $CsVO_3$ (cesium vanadate) are efficient diesel soot oxidation catalysts which provide lower soot ignition temperatures and higher soot combustion rates than other catalysts. These eutectic salts perform well as catalysts because of their low melting points, 520° C. for $KVO_3$ and 641° C. for $CsVO_3$ (see, for example, U.S. Pat. No. 4,515,758 to Domelse et al.). The low melting temperature of the eutectic salts causes them to be partially melted when the soot burns and this partial melting results in more efficient contact with the soot and thus efficient combustion. The low melting point of these eutectic salts, however, causes them to have high mobility when coated on a wall-flow diesel particulate filter. Under diesel engine exhaust treatment conditions, lack of durability as evidenced by loss of adhesion of the catalyst is a significant problem.

There thus remains a need for catalyst formulations for catalyzed diesel particulate filters that have good catalytic properties and low soot ignition temperatures.

The above described and other features are exemplified by the following figures and detailed description.

SUMMARY OF THE DISCLOSURE

Disclosed herein is a method for preparing a catalyst composition comprising: preparing; combining an alkali metal aluminate precursor and a catalytic metal salt to form a mixture; and calcining the mixture to form an alkali metal aluminate comprising a substantially uniformly dispersed alkali metal catalytic metal oxide. Also disclosed is a process treating diesel soot, comprising contacting the soot with an alkali metal aluminate comprising a substantially uniformly dispersed alkali metal catalytic metal oxide.

DETAILED DESCRIPTION

Figure 1:
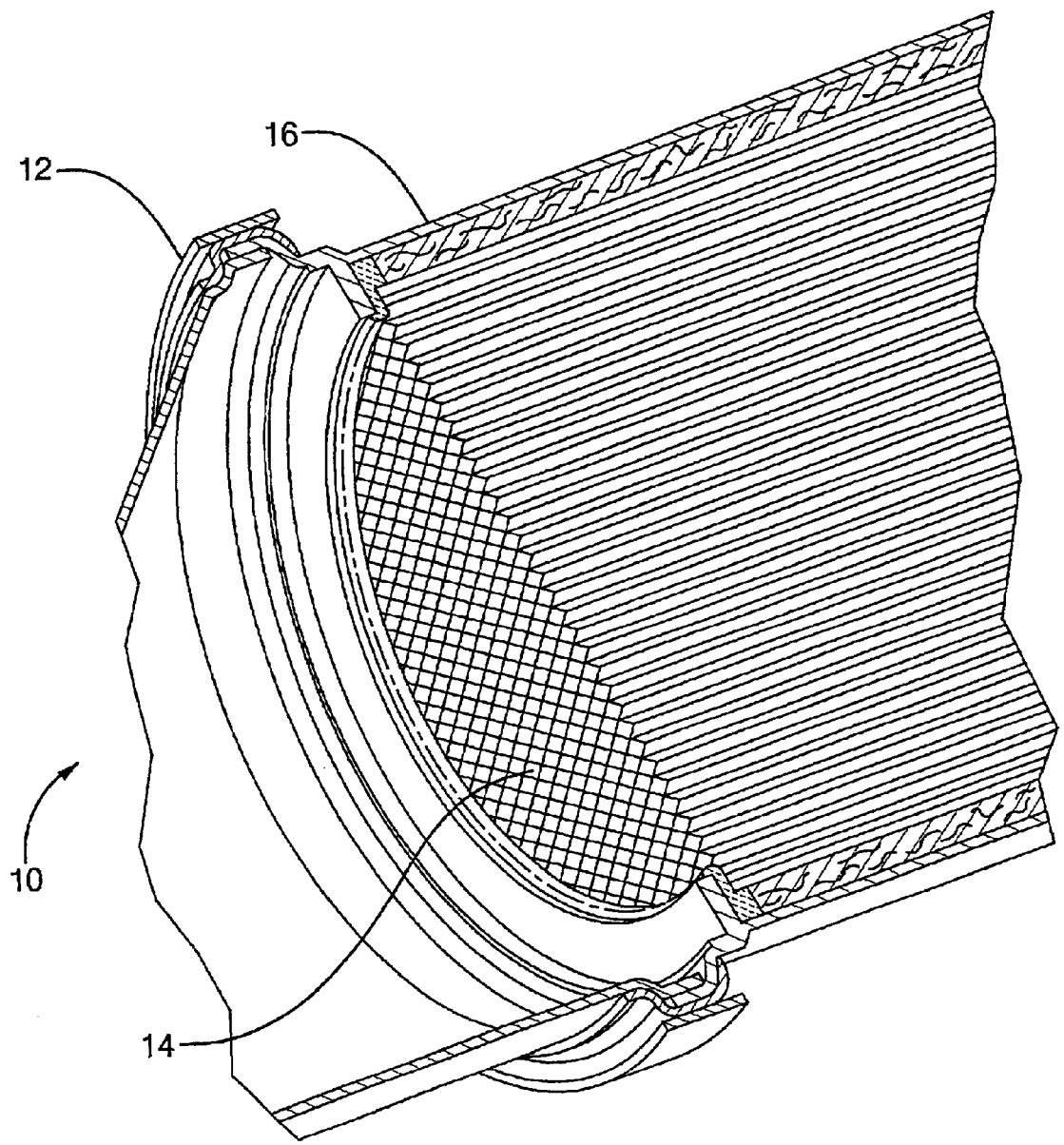
FIG. 1 is a partially cut-away cross-sectional perspective view of a catalyzed diesel particulate filter.

A diesel particulate filter element (DPF) is a structure in which particulate emission components such as soot are trapped and combusted. A catalyst composition for purification of exhaust gases is a composition that catalyzes the removal of pollutants from exhaust gas. A catalyst composition is disposed on or within a substrate to form a catalytic element. A catalyzed diesel particulate filter (CDPF) of this disclosure comprises a substrate and a catalyst composition formed from an inorganic precursor and a catalytic metal.

A preferred catalyst composition is one that can be disposed on a substrate such that a minimal pressure drop increase is observed as exhaust passes through the substrate. The pressure drop when the exhaust passes through the DPF increases with the amount of particulates collected in the trap. If the pressure drop is too high, the engine performance may be hampered due to the backpressure. Thus the DPF should keep the pressure drop at a minimal level at the beginning of use as well as after a large amount of particulates have been collected in the trap. A preferred pressure drop is below about 30 kPa (kilopascals) both at the beginning of use as well as during the useful lifetime of the DPF.

The inorganic precursor of the catalyst composition comprises an alkali metal aluminate precursor. The alkali metal aluminate precursor is preferably formed by the protocol of, for example, U.S. Pat. No. 5,614,596. For example, the alkali metal aluminate precursor can be formed by the reaction of an alkali hydroxide, aluminum hydroxide and a complexing agent. Suitable complexing agents include triethanolamine (TEA) and trisopropanolamine (TIPA). An alkali metal aluminate precursor can be formed by reacting (e.g. distilling) lithium hydroxide, aluminum hydroxide and TEA. Another alkali metal aluminate precursor can be formed by reacting (e.g., distilling) potassium hydroxide, aluminum hydroxide, and TEA. Yet another alkali metal aluminate precursor can be formed by reacting (e.g., distilling) cesium hydroxide, aluminum hydroxide, and TEA. The alkali metal aluminate precursor is preferably a polymer containing metal-triethanolamine complexes. The solution resulting from the above-described reactions is referred to as an alkali metal aluminate precursor because calcination of this solution (e.g., at temperatures of about 500° C. to about 800° C.), will result in the production of the corresponding alkali metal aluminate. Some possible alkali metal aluminates include lithium aluminate, potassium aluminate, and cesium aluminate, and combinations comprising one or more of the foregoing aluminates. Formation of an alkali metal aluminate after calcinations can be confirmed by X-ray diffraction.

The catalyst composition also comprises a catalytically active metal that reacts with and converts pollutants (e.g., unburned hydrocarbons, CO (carbon monoxide) and/or $NO_x$ (nitrous oxides) and the like) to water, $CO_2$ (carbon dioxide), $N_2$ (nitrogen) and the like. The catalytic metal reduces the concentration of at least one component of the exhaust gas. Typical catalytically active metals include platinum (Pt), palladium, rhodium, iridium, osmium, ruthenium, tantalum, zirconium, yttrium, cerium, nickel, copper, and the like, as well as oxides, alloys and combinations comprising at least one of the foregoing metals, and other catalysts, with platinum preferred.

The catalytic metal can be added to the alkali metal aluminate precursor in the form of a catalytic metal salt. Suitable catalytic metal salts include, for example, platinum nitrate, platinum sulfite, and platinum hydroxides such as $Pt(OH)_6$ (ethanolamine)$_2$ (platinum ethanolamine hydroxide) and $Pt(NH_3)_4(OH)_2$ (platinum amino hydroxide). Platinum nitrate and platinum hydroxides are particularly preferred.

The catalyst composition comprising of an alkali metal aluminate and an alkali metal catalytic metal oxide can be formed by calcining an alkali metal aluminate precursor in the presence of a catalytic metal salt. Calcining can be performed, for example, on a catalyst substrate. Calcining the mixture of the alkali metal aluminate and alkali metal catalytic metal oxide provides an atomically isolated, substantially uniformly dispersed catalytic metal.

The alkali metal aluminate comprising a substantially uniformly dispersed alkali metal catalytic metal oxide is formed by first heating the mixture of the alkali metal aluminate precursor and catalytic metal salt to a temperature sufficient to remove non-reacted TEA. Once the excess TEA is removed, the temperature is increased to a sufficient temperature to decompose metal triethanolamine complexes. Finally the temperature is increased to a third temperature sufficient to form the mixture of alkali metal aluminate and alkali metal catalytic metal oxide. For example, a mixture of lithium aluminate precursor and platinum nitrate can be heated up to about 150° C. to remove non-reacted TEA, then heated up to about 400° C. to decompose metal triethanolamine complexes, and finally heated up to about 450° C. to about 650° C. to form the mixture of alkali metal aluminate and alkali metal catalytic metal oxide. Heating to about 450° C. to about 650° C. is sufficient to form a mixture of alkali metal aluminate and alkali metal catalytic metal oxide as well as some unreacted catalytic metal. This mixture containing both unreacted catalytic metal and alkali metal catalytic metal oxide can be used for CDPF applications.

Optionally, the mixture of alkali metal aluminate, alkali metal catalytic metal oxide and catalytic metal can be calcined again for a sufficient time and at a sufficient temperature to convert any remaining catalytic metal to the alkali metal catalytic metal oxide, (e.g., at up to about 750° C. to about 900° C. for up to about 16 hours or so). The mixture of alkali metal aluminate and alkali metal catalytic metal oxide which is substantially free of unreacted catalytic metal can also be used for CDPF applications. A mixture of alkali metal aluminate and alkali metal catalytic metal oxide, which is substantially free of unreacted catalytic metal, preferably comprises less than about 5 wt % (weight percent, based on the total weight of the catalytic metal in the whole mixture) unreacted catalytic metal. Preferably, however, the mixture comprises less than about 2 wt % unreacted catalytic metal based on the total weight the catalytic metal in the whole of the mixture.

The improved method described herein provides a substantially uniform dispersion of the alkali metal catalytic metal oxide in the alkali metal aluminate. The crystalline domain size of the substantially uniform dispersion of alkali metal catalytic metal oxide calculated using the full-width-at-maximum-intensity of the (003) X-ray diffraction peak in the Scherer equation. The calculated crystalline domain size is typically less than 500 Å (Angstroms). Calcining the alkali metal aluminate precursor/catalytic metal salt mixture as described herein, however, has the advantage of producing a substantially uniform dispersion of the catalytic metal. Substantially uniform dispersion of the alkali metal catalytic metal oxide in the alkali metal aluminate produces a more effective catalyst. In addition to the above-described methods, the alkali metal catalytic metal oxide can also be made by impregnation of a catalytic metal salt such as platinum nitrate onto an alkali metal aluminate powder. The resulting powder can be calcined for a sufficient time and at a sufficient temperature to produce the alkali metal catalytic metal oxide, for example, calcining at about 500 to about 800° C. for up to about 16 hours or so in air. The mixture of alkali metal aluminate and alkali metal catalytic metal oxide can also be formed by, for example, reacting an alkali metal carbonate and metallic platinum (Joint Committee of Powder Diffraction Standards (JCPDS), International Center for Diffraction, card No. 29-0820).

Referring now to FIG. 1, CDPF 10 is illustrated. The CDPF 10 comprises an outer shell 12, a retention mat 16 and a catalyst substrate 14. The CDPF 10 comprises a catalyst composition disposed on or throughout the substrate 14, which is in turn located within the shell 12. A retention mat is typically placed between the catalyst substrate and the shell.

A CDPF shell 12 is a protective metal layer that is disposed around the catalyst substrate 14 and retention mat 16. The shell is of a shape and size that is suitable to contain the catalyst and to protect it from such operating conditions as severe mechanical shocks. The choice of material for the shell depends upon the type of exhaust gas, the maximum temperature reached by the catalyst substrate, the maximum temperature of the exhaust gas stream, and the like. Suitable materials for the shell can comprise any material that is capable of resisting under-car salt, temperature and corrosion. Typically, ferrous materials are employed such as ferritic stainless steels. Ferritic stainless steels can include stainless steels such as, e.g., the 400—Series such as SS-409, SS-439, and SS-441, with grade SS-409 generally preferred.

Located between the shell 12 and the catalyst substrate 14 is a retention mat 16. The function of the mat is to hold the catalyst substrate in place and, in some instances, to insulate the shell from the heat of the substrate during operation. The mat support material can either be an intumescent material (e.g., one which contains ceramic materials, and other conventional materials such as organic binders and the like, or combinations comprising at least one of the foregoing materials, and a vermiculite component that expands with heating to maintain firm uniform compression, or non-uniform compression, if desired) or a non-intumescent material, as well as materials which include a combination of both.

The catalyst substrate 14 preferably has a size and geometry chosen to optimize the surface area in a given diesel particulate filter design. The substrate can comprise any material designed for use in a spark ignition or diesel engine environment and having the following characteristics: (1) capable of operating at temperatures up to about 600° C. or so, depending upon the device's location within the exhaust system; (2) capable of withstanding exposure to hydrocarbons, nitrogen oxides, carbon monoxide, particulate matter (e.g., soot and the like), carbon dioxide, and/or sulfur; and (3) having sufficient surface area and structural integrity to support a catalyst, if desired. Some possible materials include cordierite, silicon carbide, metal, metal oxides (e.g., alumina, and the like), glasses, and the like, and mixtures comprising at least one of the foregoing materials.

Some ceramic materials include "Honey Ceram", commercially available from NGK-Locke, Inc, Southfield, Mich., and "Celcor", commercially available from Corning, Inc., Corning, N.Y. These materials can be in the form of foils, porous materials, sponges, and the like, e.g., metallic foils, open pore alumina sponges, and porous ultra-low expansion glasses.

A monolithic diesel particulate filter element can be a wall flow filter comprising honeycombed, porous crystalline ceramic (e.g. cordierite) material. Alternate cells of the honeycombed structure are preferably plugged such that exhaust gas enters in one cell, is forced through the porous walls of the cell, and then exits the structure through another cell. The size of the diesel particulate filter element depends upon the particular application.

Disposed on and/or throughout the catalyst substrate is the catalyst composition (e.g., the alkali metal aluminate and the alkali metal catalytic metal oxide). The catalyst composition is wash coated, imbibed, impregnated, physisorbed, chemisorbed, precipitated, or otherwise applied to the catalyst substrate by such techniques as spraying, dipping or painting, for example. The alkali metal aluminate/alkali metal catalytic metal oxide composition can be employed in an amount sufficient to catalyze a reduction in concentration of at least one exhaust gas component. In addition, it the alkali metal aluminate/alkali metal catalytic metal oxide composition can be deposited on the substrate in an amount that gives a back-pressure-drop increase of less than or equal to about 30 kPa. The catalyst composition loading density can be about 0.01 to about 0.5 g/in$^3$ (grams/cubic inch) (i.e., about 0.00061 to about 0.031 g/cm$^3$ (grams per cubic centimeter)), with about 0.1 to about 0.2 g/in$^3$ (i.e., about 0.0061 to about 0.12 g/cm$^3$) more preferred. A preferred catalytic metal (the total of both free catalytic metal and catalytic metal in the alkali metal catalytic metal oxide) loading density is about 0.0011 to about 0.058 g/in$^3$ (i.e., about 0.000067 to about 0.0035 g/cm$^3$) with about 0.0058 to about 0.041 g/in$^3$ (i.e., about 0.00035 to about 0.0025 g/cm$^3$) more preferred.

EXAMPLES

Example 1

Formation of Alkali Metal Aluminate Precursor

To form the alkali metal aluminate precursor, 1.0 mole of lithium hydroxide, 1.0 mole of aluminum hydroxide, and 2 moles of triethanolamine (TEA) were mixed in a 1 L (liter) round-bottom flask with 0.7 L of ethylene glycol as a solvent. The mixture was distilled for a time sufficient to produce a clear yellow solution or sol. The yellowish solution or sol is referred to as the alkali metal aluminate precursor.

Figure 2:
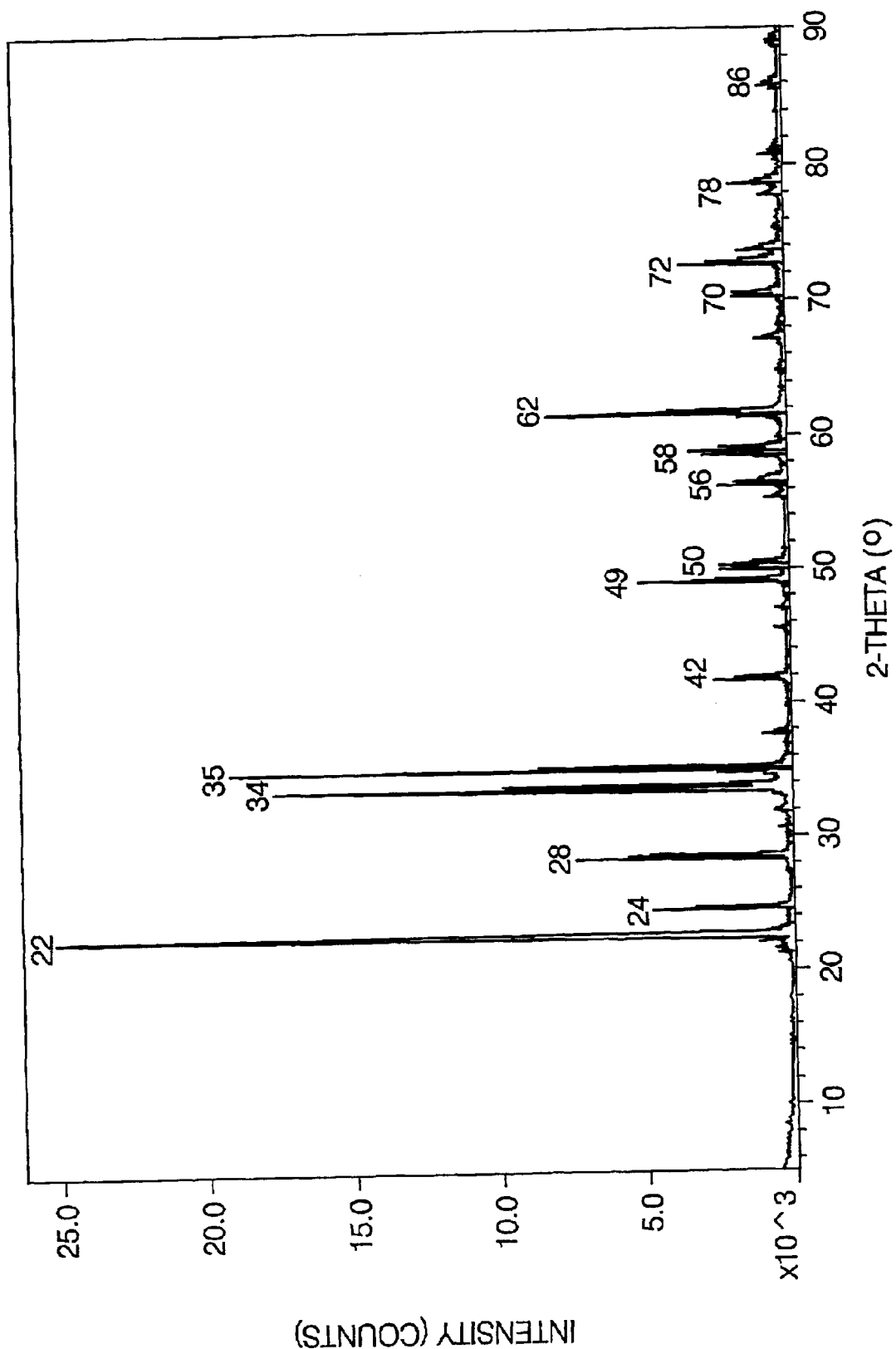
FIG. 2 shows x-ray diffraction data for lithium aluminate ($LiAlO_2$).

To verify the presence of the alkali metal aluminate precursor, the precursor was calcined at 650° C. The presence of alkali metal aluminate was confirmed by x-ray diffraction. FIG. 2 shows the x-ray diffraction data for lithium aluminate. The peaks corresponding the lithium aluminate are labeled and further listed in Table 1.

TABLE 1

X-ray diffraction 2-theta peak positions for LiAlO$_2$, Li$_2$PtO$_3$ and Pt.

| LiAlO$_2$ | Li$_2$PtO$_3$ | Pt |
|---|---|---|
| 22.962 | 18.469 | 40.000 |
| 28.586 | 19.756 | 46.243 |
| 33.928 | 35.150 | 68.000 |
| 36.649 | 43.000 | 81.286 |
| 38.000 | 47.149 | 86.010 |
| 43.123 | 54.024 | |
| 46.986 | 62.000 | |
| 50.794 | 62.890 | |
| 55.879 | 73.261 | |
| 57.478 | 75.442 | |
| 60.197 | 78.304 | |
| 66.870 | 79.867 | |
| 67.360 | 81.336 | |
| 71.090 | 82436 | |
| 72.543 | | |
| 72.608 | | |

Example 2

First Formation of the Alkali Metal Catalytic Metal Oxide (Black Powder)

Figure 3:
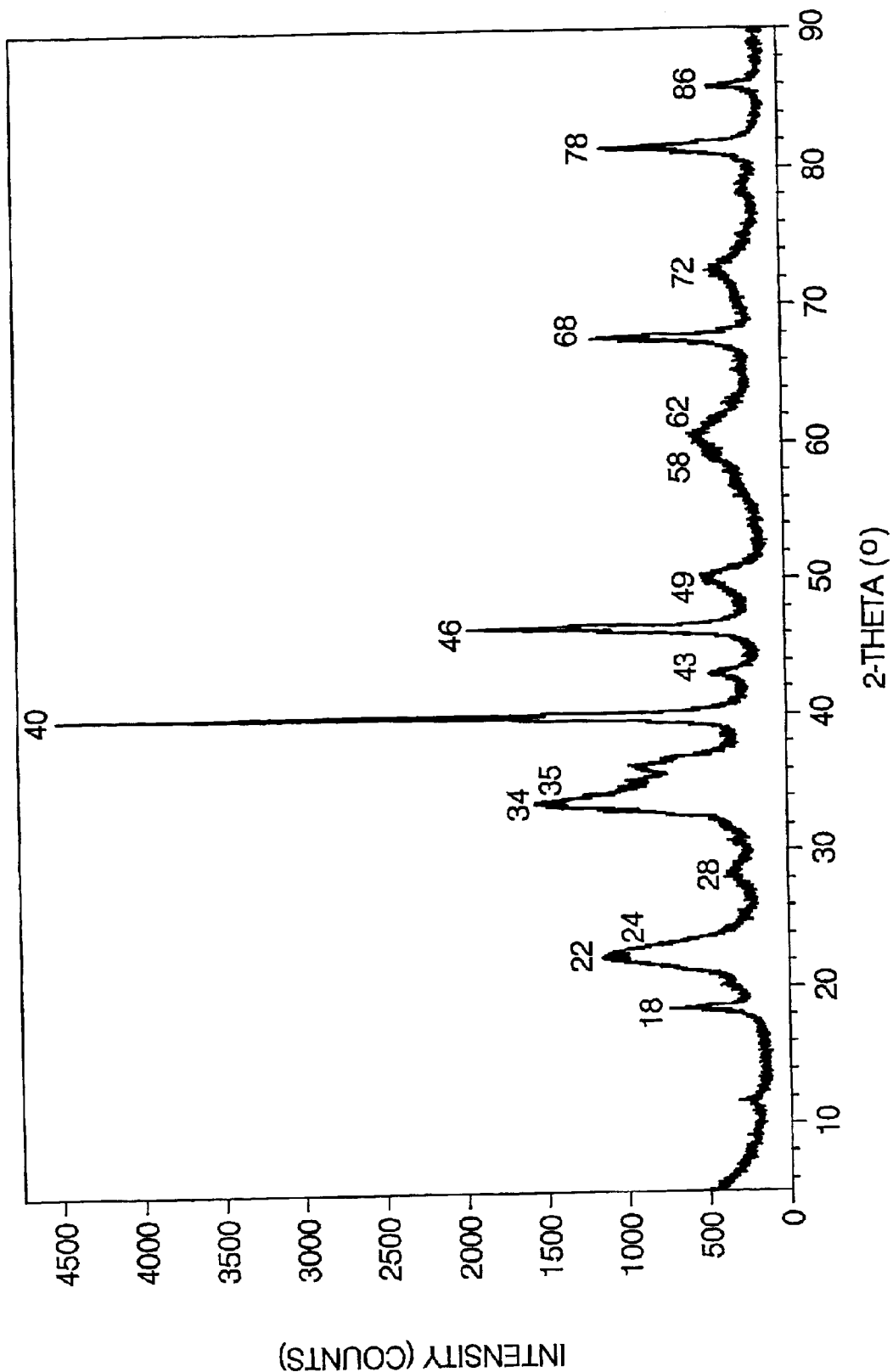
FIG. 3 shows x-ray diffraction data for lithium aluminate, lithium platinum oxide ($LiPtO_3$), and platinum.

500 g of the alkali metal aluminate precursor solution with 20 wt % of volatile free solid or sol was then mixed with 58.3 g of aqueous platinum nitrate solution (12 wt % of Pt). The resulting viscous mixture was then poured into a ceramic calcination dish and put into a calcination furnace. The temperature was ramped at 5° C./min until it reached 150° C. The mixture was then incubated for 3 hours to remove the unreacted TEA. The temperature was then increased to 400° C. for 2 hours to decompose the metal triethanolamine complexes. The temperature was then increased to 540° C. for 4 hours. A powder with metallic shining black color was obtained. X-ray diffraction of the black powder indicates the presence of poorly crystallized LiAlO$_2$, Li$_2$PtO$_3$ and metallic Pt. FIG. 3 shows the x-ray diffraction data for the black powder containing lithium aluminate (LiAlO$_2$), lithium platinum oxide (LiPtO$_3$) and platinum. The peaks corresponding to lithium aluminate (LiAlO$_2$), lithium platinum oxide (LiPtO$_3$) and platinum are labeled in FIG. 3 and listed in Table 1.

Example 3

Second Formation of the Alkali Metal Catalytic Metal Oxide (Yellow Powder)

Figure 4:
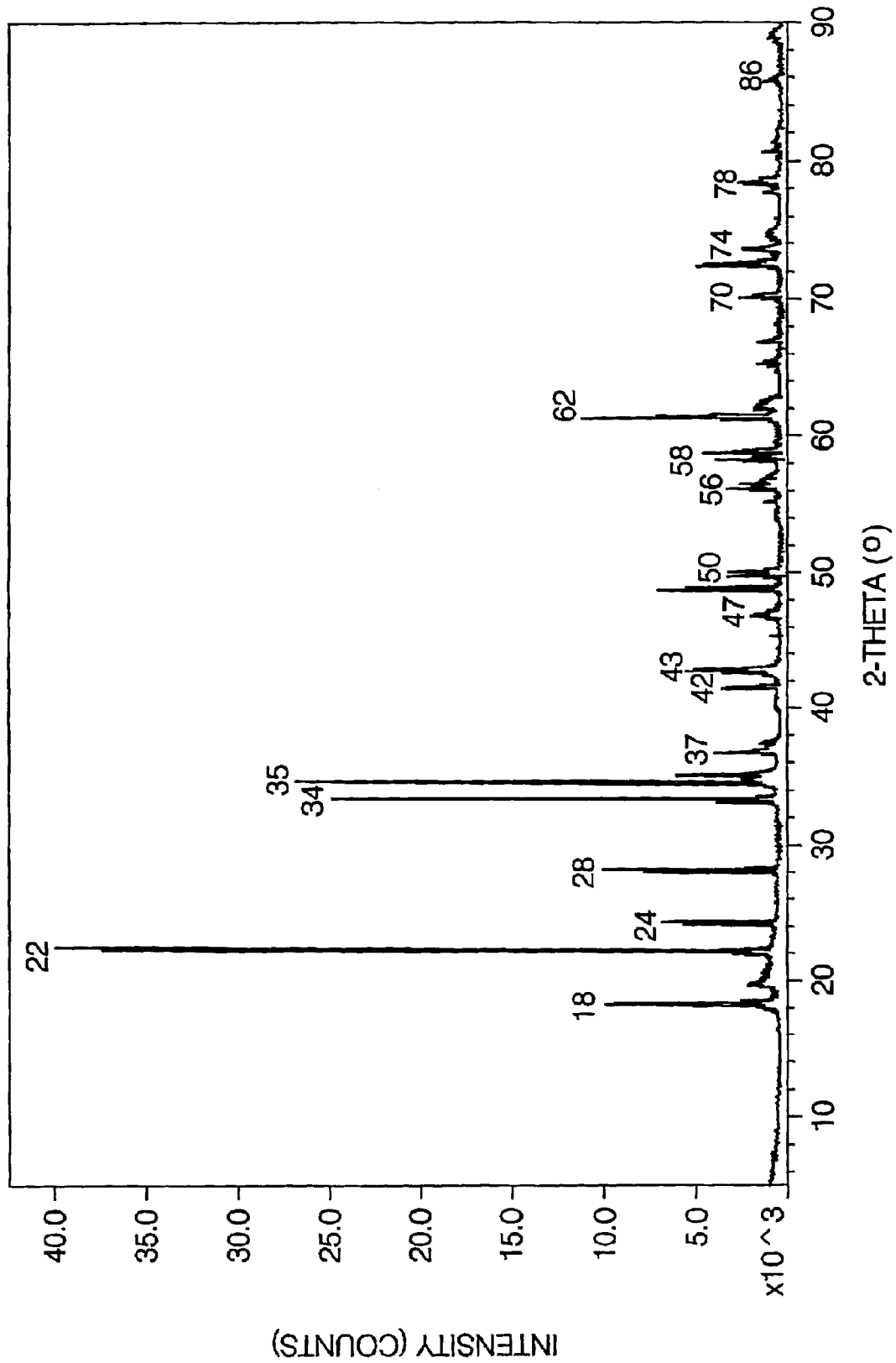
FIG. 4 shows x-ray diffraction data for lithium aluminate and lithium platinum oxide.

The black powder from Example 2 was then calcined at 800° C. for 16 hours. The resulting powder was bright yellow. X-ray diffraction indicates the presence of LiAlO$_2$ and Li$_2$PtO$_3$ with only sharp diffraction lines indicating the presence of well-defined crystals. The metallic Pt present in the black powder disappeared. FIG. 4 shows x-ray diffraction data for lithium aluminate (LiAlO$_2$) and lithium platinum oxide (LiPtO$_3$). The peaks corresponding to lithium aluminate (LiAlO$_2$) and lithium platinum oxide (LiPtO$_3$) are labeled in FIG. 4 and listed in Table 1.

Example 4

Properties of the Alkali Metal Aluminate with Substantially Uniformly Dispersed Alkali Metal Catalytic metal Oxides TGA (Thermal Gravimetric Analysis) studies show that soot ignites at 366° C. for the black powder and 372° C. for the yellow powder. The soot ignition temperature was measured on a TGA instrument. The soot collected from an Opel diesel engine was dry-mixed with the alkali metal aluminate comprising a substantially uniformly dispersed alkali metal catalytic metal oxide in a ratio of 1 to 1 (by wt). The mixture was ground with a pestle in a mortar for maximum blending. Then 15 mg of the mixture was loaded on a TGA sample bucket for analysis in a stream of air. The onset temperature for beginning of weight loss was used as the soot ignition temperature.

Comparative Example 5

In order to combust the solid-form soot efficiently, it would be beneficial to have the soot closely contact the solid-form catalyst. If the solid catalyst would tend to melt with low volatility, then the catalyst would be suitable for passive soot combustion. Partial melting behavior for the alkali metal catalytic metal oxide and alkali metal aluminate was observed after TGA analysis up to 800° C. Because $LiAlO_2$ melts at 1650° C., the low melting behavior of the mixture is likely due to the presence of $Li_2PtO_3$. This partial melting behavior is a strong indication that the alkali metal catalytic metal oxide highly dispersed in the alkali metal aluminate phase lowered the melting point of each individual phase. As shown in Table 2, the alkali metal aluminate, and alkali metal catalytic metal oxide composition can decrease the soot ignition temperature by greater than or equal to 10° C., preferably greater than or equal to 50° C., and in some cases greater than or equal to 100° C. This melting point lowering provides closer contact with solid-form soot resulting in significant lowering of the catalytic soot ignition temperature.

TABLE 2

TGA analysis of catalyst compositions

| Composition | Soot ignition temperature, ° C. |
| --- | --- |
| Black powder | 366 |
| Yellow powder | 372 |
| Conventional Pt catalyst made using Pt nitrate | 392 |
| Conventional Pt catalyst made using sulfate | 470 |
| Uncatalyzed | 620 |

The catalyst composition for a CDPF disclosed herein comprises an alkali metal catalytic metal oxide dispersed in an alkali metal aluminate. This catalyst formulation maintains the catalytic metal in an atomically isolated form, thus preventing catalytic metal sintering. The atomic isolation and substantially uniform dispersion of the catalytic metal result in lowering of the soot ignition temperature by greater than or equal to 50° C., with a reduction of greater than 100° C. often obtained, as compared to other catalysts (e.g., from 470° C. to 366° C.). Lowering the ignition temperature of the diesel soot is important for a passive DPF, that is, a DPF which does not require exposure to increased external temperatures to burn off soot. The combination of alkali metal aluminate and alkali metal catalytic metal oxide catalyst enables the use of a low-back-pressure-drop CDPF.

An additional feature of the catalyst composition disclosed herein is that the catalytic metal in the form of an alkali metal catalytic metal oxide maintains its catalytic activity in the alkali metal catalytic metal oxide complex.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for preparing a catalyst composition comprising:

combining a precursor of an alkali metal aluminate and a catalytic metal salt to form a mixture; and calcining the mixture to form an alkali metal aluminate comprising a substantially uniformly dispersed alkali metal catalytic metal oxide.

2. The method of claim 1, wherein the precursor of an alkali metal aluminate is selected from the group consisting of a lithium aluminate precursor, a potassium aluminate precursor, a cesium aluminate precursor, and combinations comprising one or more of the foregoing precursors.

3. The method of claim 2, further comprising preparing the precursor of an alkali metal aluminate by distilling an alkali metal hydroxide, aluminum hydroxide and triethanolamine.

4. The method of claim 1, wherein the catalytic metal salt is selected from the group consisting of platinum nitrate, platinum amino hydroxide and combinations comprising one or more of the foregoing catalytic metal salts.

5. The method of claim 1, wherein the alkali metal catalytic metal oxide comprises an atomically isolated catalytic metal.

6. The method of claim 5, wherein the alkali metal aluminate further comprises the metallic form of a catalytic metal.

7. A catalytic element, comprising:

a substrate comprising an alkali metal catalytic metal oxide substantially uniformly dispersed in an alkali metal aluminate.

8. The catalytic element of claim 7, wherein the alkali metal aluminate is selected from the group consisting of lithium aluminate, potassium aluminate, cesium aluminate, and mixtures comprising one or more of the foregoing aluminates.

9. The catalytic element of claim 7, wherein the alkali metal catalytic metal oxide comprises lithium platinum oxide.

10. A process for treating diesel soot, comprising:

contacting the soot with an alkali metal aluminate comprising a substantially uniformly dispersed alkali metal catalytic metal oxide.

11. The process of claim 10, wherein the alkali metal aluminate is selected from the group consisting of lithium aluminate, potassium aluminate, cesium aluminate or combinations comprising one and more of the foregoing precursors.

12. The process of claim 10, wherein the alkali metal catalytic metal oxide comprises lithium platinum oxide.

* * * * *